C. B. MANBECK.
CANDLE GATHERING IMPLEMENT.
APPLICATION FILED MAY 17, 1909.
934,196.
Patented Sept. 14, 1909.
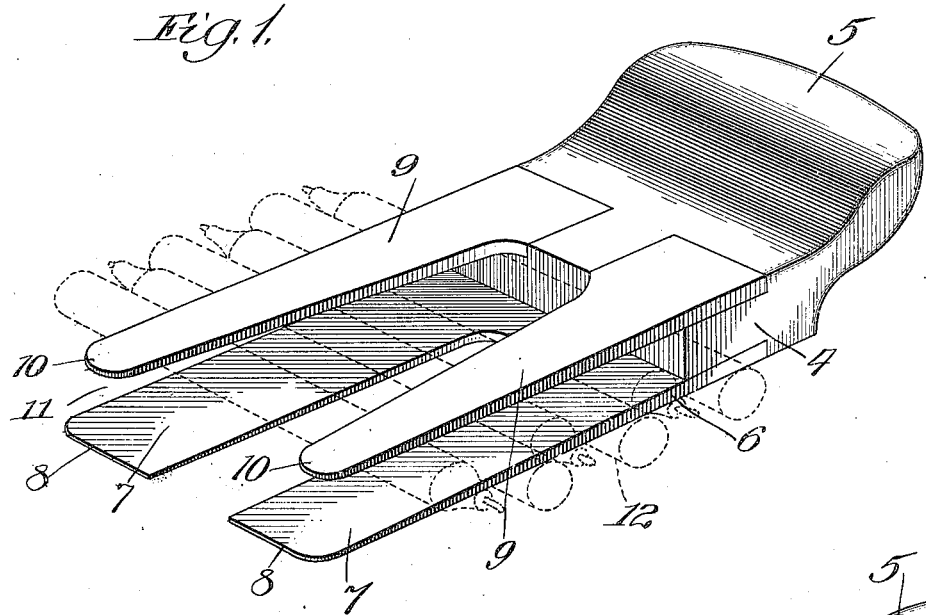
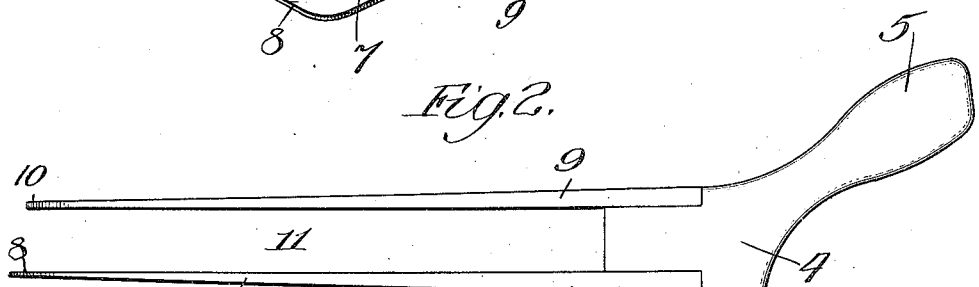
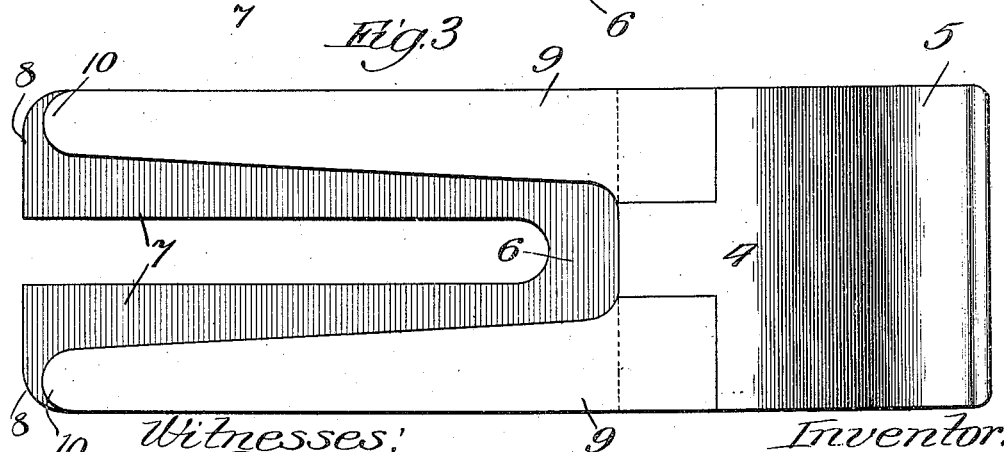
Witnesses:
Chas. L. Gaylord,
Clyde C. Palmer.
Inventor:
Charles B. Manbeck,
By Dyrenforth, Lee, Chritton & Wiles,
Attys.

UNITED STATES PATENT OFFICE.

CHARLES B. MANBECK, OF WHITING, INDIANA, ASSIGNOR TO STANDARD OIL COMPANY, OF CHICAGO, ILLINOIS, A CORPORATION OF INDIANA.

CANDLE-GATHERING IMPLEMENT.

934,196. Specification of Letters Patent. Patented Sept. 14, 1909.

Application filed May 17, 1909. Serial No. 496,596.

*To all whom it may concern:*

Be it known that I, CHARLES B. MANBECK, a citizen of the United States, residing at Whiting, in the county of Lake and State of Indiana, have invented a new and useful Improvement in Candle-Gathering Implements, of which the following is a specification.

My invention relates to an improved construction of gathering implement adapted for running a group of candles or tapers from a platform in the assembled condition in which they have previously been discharged thereon, for the purpose of placing them in a box in that condition, which is that of a layer.

A candle-assorting machine for delivering upon a platform a predetermined number of candles, forming a group, to be thereafter removed by my improved gathering implement, forms the subject of a separate application for Letters Patent filed concurrently herewith.

Referring to the drawings—Figure 1 is a perspective view of my improved gathering-implement showing, by dotted representation, a group of tapers therein; Fig. 2, a view in side elevation of the implement; and Fig. 3, a plan view of the same.

A head 4, of a width preferably equal to approximately two-thirds the length of the candles, is provided with an upturned extension 5 forming a handle. This extension is preferably of the same width as the head and suitably curved to comfortably fit the natural closure of the hand, to enable the operator to maintain a firm grip thereon without cramping the member during continued use of the device. A lower plate 6, preferably slotted or bifurcated as shown in Fig. 1 to form lifting-members 7, is let into the head at the base and rigidly attached thereto in any desired manner; and fingers 9, let into and secured to the head at the upper side thereof, project over the members 7. The space between the members 7 and the fingers 9 is slightly greater than the diameter of the candles with which the implement is designed to be used, to permit them to freely roll therein, and the members 7 taper gradually from the head to their extremities to form thin tips 8 to permit of their being readily slipped beneath the candles when disposed in series on a platform or support. The fingers 9 gradually taper toward their extremities to form thin tips 10. The members 7 and fingers 9 should both be flush with the head at their outer edges, as shown.

The implement is applied to its use in the following manner: Assuming a group of candles to have been properly delivered by the aforesaid medium upon a platform, the operator shoves the gatherer along the platform-surface to engage the candles. The tips 8 of the members being very thin and their taper being very slight, they lift the candles upon contact therewith and pass under them without causing the candles to roll along the platform, and without producing other effect than that of lifting them from their support. As soon as all the candles of the group have entered the space 11 between the members and fingers the operator elevates the tips 8 and 10 to cause the candles to roll toward the head 4; whereupon he places the tips in the far corner of the box to be filled and upon quickly withdrawing the implement the candles are thereby deposited in a layer in the box.

It will be understood that the number of candles in a series just equals the number which can be placed in a layer in the box to be packed and that the implement used is but slightly longer than the series. For filling boxes of larger or smaller size, by the use of my improved implement, the latter is provided with the space-forming plate and fingers in proper length to adapt the space to receive a longer or shorter series of the candles.

What I claim as new, and desire to secure by Letters Patent, is—

1. A candle-gathering implement comprising a head provided with a handle, and a plate and fingers extending from opposite sides of the head and forming between them a candle-receiving space, said plate and fingers being of substantially the same length and the space between them being substantially the thickness of the candles to be gathered, for the purpose set forth.

2. A candle-gathering implement comprising a head provided with a handle, a bifurcated plate extending from one side of the head and terminating in thin tips, and fingers of substantially the length of the plate extending from the opposite side of the head and forming with said plate a candle-receiving space, for the purpose set forth.

3. A candle-gathering implement comprising a head provided with a handle, a plate extending from one side of the head, a finger of substantially the length of the plate extending from the opposite side of the head and forming with said plate a candle-receiving space, the width of said space being but slightly in excess of the thickness of the candles to be gathered.

CHARLES B. MANBECK.

In presence of—
   J. G. ANDERSON,
   R. A. SCHAEFER.